United States Patent
Powers et al.

(10) Patent No.: US 10,078,510 B1
(45) Date of Patent: Sep. 18, 2018

(54) LATE-STAGE SOFTWARE FEATURE REDUCTION TOOL FOR SECURITY AND PERFORMANCE

(71) Applicant: Architecture Technology Corporation, Minneapolis, MN (US)

(72) Inventors: Judson Powers, Ithaca, NY (US); Daniel McArdle, Seneca Falls, NY (US); Robert A. Joyce, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 15/785,940

(22) Filed: Oct. 17, 2017

(51) Int. Cl.
  *G06F 9/44* (2018.01)
  *G06F 8/71* (2018.01)
  *G06F 8/41* (2018.01)
  *G06F 8/61* (2018.01)

(52) U.S. Cl.
  CPC .............. *G06F 8/71* (2013.01); *G06F 8/4441* (2013.01); *G06F 8/62* (2013.01)

(58) Field of Classification Search
  CPC ........................................................ G06F 8/71
  USPC ........................................................ 717/121
  See application file for complete search history.

(56) References Cited

U.S. PATENT DOCUMENTS

| | | | |
|---|---|---|---|
| 6,029,065 A * | 2/2000 | Shah ...................... | H04W 8/245 370/259 |
| 7,721,259 B2 * | 5/2010 | Heinke ............... | G06F 9/44505 717/120 |
| 2005/0251794 A1 * | 11/2005 | Taylor .................. | G06F 11/362 717/148 |
| 2011/0083044 A1 * | 4/2011 | Ghosh ................. | G06F 11/3636 714/38.1 |

FOREIGN PATENT DOCUMENTS

CN          102246139 A   * 11/2011   .......... G05B 19/058

OTHER PUBLICATIONS

SourceForge "HtmlUnit/Mailing Lists", Aug. 8, 2012, p. 1-5 and 64 [online][retrieved on Jan. 19, 2018] Retrieved from <https://sourceforge.net/p/htmlunit/mailman/htmlunit-develop/?viewmonth=201208&viewday=8>.*

(Continued)

*Primary Examiner* — Evral E Bodden
(74) *Attorney, Agent, or Firm* — Shumaker & Sieffert, P.A.

(57) ABSTRACT

In general, the techniques of this disclosure describe a method that includes receiving, by a computing device, a user interaction for identifying one or more undesired features of a software program to be removed. The software program is provisioned on the computing device as a software binary. The method further including identifying, by the computing device, one or more execution paths of the software binary that implement the one or more undesired features. Identifying the one or more execution paths includes outputting an indication directing the user to interact with the one or more undesired features, generating undesired feature information of an execution log, and determining the one or more execution paths using the execution log. The method further includes removing, by the computing device, the one or more execution paths to generate a modified software binary.

18 Claims, 5 Drawing Sheets

(56) References Cited

OTHER PUBLICATIONS

Mitchell et al., "The Diary of a Datum: An Approach to Analyzing Runtime Complexity in Framework-Based Applications", In Proceedings of the Workshop on Library-Centric Software Design (LCSD), Aug. 23, 2005, 7 pgs.

Jiang et al., "JRed: Program Customization and Bloatware Mitigation Based on Static Analysis", In Proceedings of the 40th IEEE Computer Society International Conference on Computers, Software & Applications (COMPSAC), 2006, 10 pgs. Applicant points out, in accordance with MPEP 609.04(a), that the year of publication, 2006, is sufficiently earlier than the effective U.S. filing date, 2017, so that the particular month of publication is not in issue.

Jiang et al., "Feature-based Software Customization: Preliminary Analysis, Formalization, and Methods." In Proceedings of the 17th IEEE High Assurance Systems Engineering Symposium (HASE), 2016, 10 pgs.Applicant points out, in accordance with MPEP 609.04(a), that the year of publication, 2016, is sufficiently earlier than the effective U.S. filing date, 2017, so that the particular month of publication is not in issue.

Kalibera et al., "A Fast Abstract Syntax Tree Interpreter for R." In Proceedings of the International Conference on Virtual Execution Environments, Mar. 2014, 14 pgs.

\* cited by examiner

LATE-STAGE SOFTWARE FEATURE REDUCTION TOOL FOR SECURITY AND PERFORMANCE

TECHNICAL FIELD

The disclosure relates to methods and devices for software customization.

BACKGROUND

Modern software typically contains a vast collection of features, many of which go unused by most users, but are often included to permit a one-size-fits-all methodology commonly practiced in development and deployment efforts. Developers typically attempt to design each feature to minimize compatibility problems, minimize a reduction in performance caused by a respective feature, minimize user privacy concerns, and minimize user frustration.

SUMMARY

In general, the techniques of this disclosure describe methods and devices (e.g., a processor executing a software tool) for end users to perform semi-automated late-stage software customization by removing unwanted features. The software tool may be designed for use by an end user with no specialized skills in software development or binary analysis and with no additional data from the software developer. The software tool may adapt one or more techniques used for black-box code-path analysis, including smart fuzzing, to determine what code paths are only exercised by a particular feature. The software tool may apply a variety of techniques to disable and remove those code paths. The software tool may use a power of advanced binary analysis tools, which to date have required considerable specialized expertise to take advantage of, to create an automated, user-friendly software tool that enables the end user to customize binary software to remove unnecessary, unwanted, and undesirable features. This may reduce or eliminate the ever-increasing software bloat that is detrimental to the user and harmful to system security.

In one example, the disclosure is directed to a method including receiving, by a computing device, a user interaction for identifying one or more undesired features of a software program to be removed. The software program is provisioned on the computing device as a software binary. The method further including identifying, by the computing device, one or more execution paths of the software binary that implement the one or more undesired features. Identifying the one or more execution paths includes outputting an indication directing the user to interact with the one or more undesired features, generating undesired feature information of an execution log for the software binary in response to the user interacting with the one or more undesired features, and determining the one or more execution paths using the execution log. The method further includes removing, by the computing device, the one or more execution paths to generate a modified software binary.

In another example, the disclosure is directed to a device comprising one or more processors configured to receive a user interaction for identifying one or more undesired features of a software program to be removed. The software program is provisioned on the computing device as a software binary. The one or more processors are further configured to identify one or more execution paths of the software binary that implement the one or more undesired features. To identify the one or more execution paths, the one or more processors are configured to output an indication directing the user to interact with the one or more undesired features, generate undesired feature information of an execution log for the software binary in response to the user interacting with the one or more undesired features, and determine the one or more execution paths using the execution log. The one or more processors are further configured to remove the one or more execution paths to generate a modified software binary.

In another example, the disclosure is directed to a computer-readable storage medium storing instructions that when executed by one or more processors cause the one or more processors to receive a user interaction for identifying one or more undesired features of a software program to be removed. The software program being provisioned on the computing device as a software binary. The instructions further cause the one or more processors to identify one or more execution paths of the software binary that implement the one or more undesired features. To identify the one or more execution paths, the one or more processors are further caused to output an indication directing the user to interact with the one or more undesired features, generate undesired feature information of an execution log for the software binary in response to the user interacting with the one or more undesired features, and determine the one or more execution paths using the execution log. The instructions further cause the one or more processors to remove the one or more execution paths to generate a modified software binary.

The details of one or more examples of the disclosure are set forth in the accompanying drawings and the description below. Other features, objects, and advantages of the disclosure will be apparent from the description and drawings, and from the claims.

DETAILED DESCRIPTION

Modern software typically contains a vast collection of features, many of which go unused by most users. These unused features, however, may have a cost to the user. Unused features unnecessarily increase an attack surface of the software, resulting in a weakening cyber security of the software. Unused features may cause compatibility problems, reduced performance, increased privacy concerns, and increased user frustration.

More specifically, modern commercial software may be bloated due to a one-size-fits-all methodology commonly practiced in development and deployment efforts. This one-size-fits-all methodology eases the burden on developers that intend to sell and deploy code to a large and diverse user base. However, the one-size-fits-all methodology may have a detrimental impact on performance and security. For example, some features built into a software program may not be needed by a typical user, but are often included with no way for such users to disable or remove such features. Between the additional code (which may contain its own bugs and vulnerabilities) and potentially undesirable functionality, such extraneous features may unnecessarily hamper performance while broadening a software product's attack surface.

One or more techniques described herein may be applied to reverse the trend toward one-size-fits-all software by creating prototype software tools that enable and empower end users to selectively remove software features they do not use or want. Examples of features to be removed may include elements of the user interface, support for legacy protocols, use of a camera or microphone, or other features that could potentially compromise privacy such as a callback or diagnostic reporting functions. Some features may manifest themselves at a system call level while other features may be more difficult to identify and trace back to specific regions of code. One or more techniques described herein do not rely on developers to have tagged their software to identify features. As such, one or more techniques described herein identify the features without relying on an identification of features and their corresponding code.

Some techniques in software reduction have focused on improving performance that do not modify the functionality of original code. However, such techniques fail to address removal of unwanted features and thus fail to tailor functionality to the end user.

Given the focus on tailoring to the end user, one or more techniques described herein may be able to operate on software configurations commonly seen at delivery to the customer (e.g., APK files for Android™ or binaries for C/C++). Techniques described herein are not restricted to a specific programming language; submitters may choose to focus on any language for which they have the expertise so long as the language is general-purpose and commonly used. Both interpreted and compiled languages may be of interest, but one or more techniques described herein may select a single language on which to focus.

A goal of this "late-stage customization" effort may include allowing each end user to better customize apps and other software for their needs specifically and reduce both the bloat and attack surface of the software they run. The end users that operates the tools may be assumed to be a "power users", but may not necessarily be a program analysis expert. After identifying which features and corresponding code to be cut, the application in question must be transparently rewritten to produce a version with selected features removed. Such techniques may occur in a semi-automated or automated fashion.

To address the foregoing problems, one or more techniques described herein include a software tool for end users to perform semi-automated late-stage software customization by removing unwanted features. The software tool may be designed for use by an end user with no specialized skills in software development or binary analysis and with no additional data from the software developer. The software tool may adapt techniques used for black-box code-path analysis, including smart fuzzing, to determine what code paths are only exercised by a particular feature. The software tool may apply a variety of techniques to disable and remove those code paths. The software tool may use advanced binary analysis tools, which to date have required considerable specialized expertise to take advantage of, to create an automated, user-friendly software tool that enables the end user to customize binary software to remove unnecessary, unwanted, and undesirable features. As such, the one or more techniques described herein may reduce or eliminate the ever-increasing software bloat that is detrimental to the user and harmful to system security.

Figure 1:
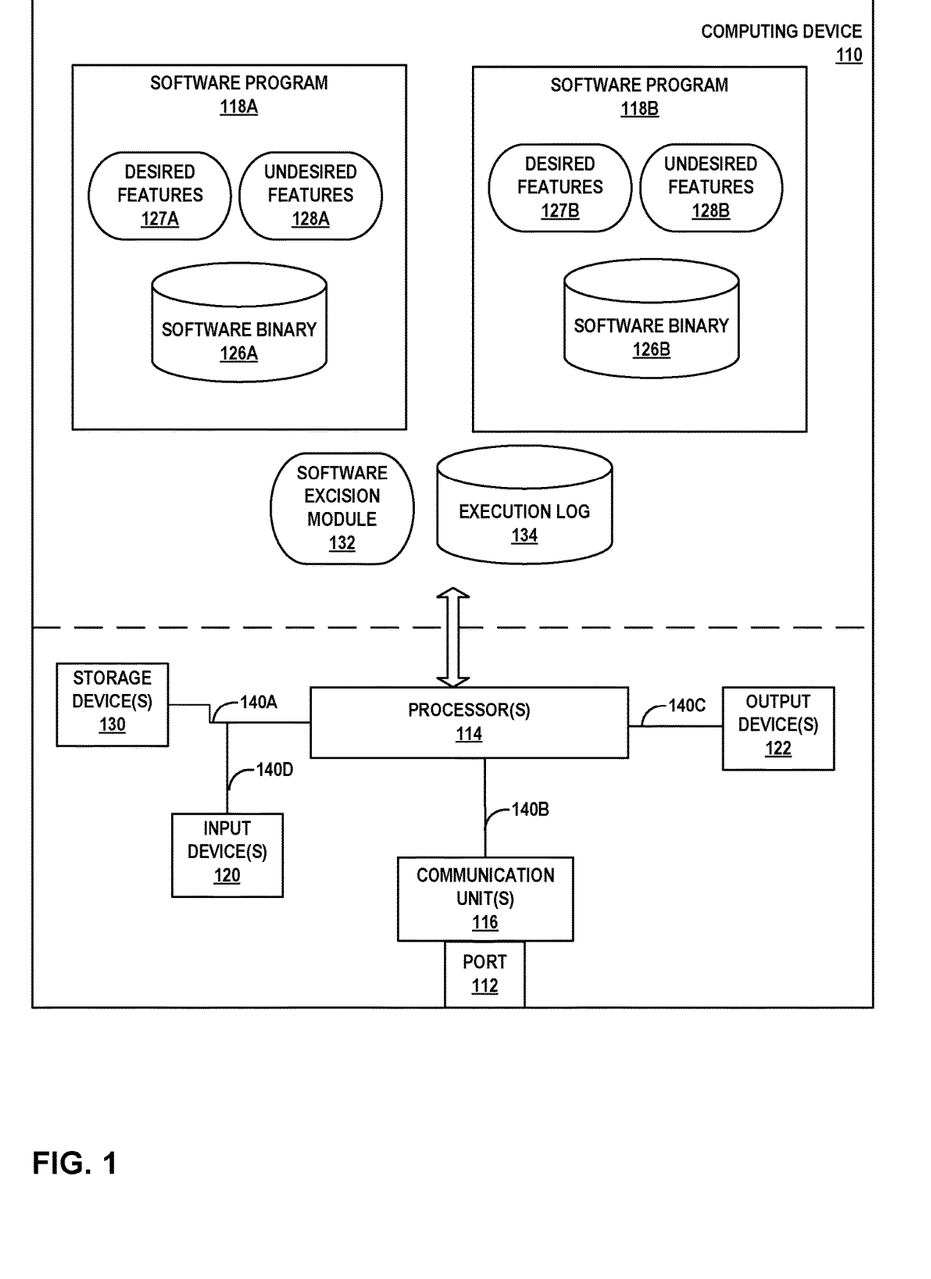
FIG. 1 is a block diagram illustrating an example of a computing device configured to perform semi-automated late-stage software customization, in accordance with one or more techniques of this disclosure.

FIG. 1 is a block diagram illustrating an example of a computing device 110 configured to perform semi-automated late-stage software customization, in accordance with one or more techniques of this disclosure.

Computing device 110 may be an end-user device (EUD). In some examples, computing device 110 may be a computing tablet. However, in some examples, computing device 110 may be a computerized watch (e.g., a smart watch), computerized eyewear, computerized headwear, other types of wearable computing devices, a smartphone, a personal digital assistant (PDA), a laptop computer, a media player, a television platform, an automobile navigation system, a digital camera, or any other type of mobile and/or non-mobile computing device that is configured to perform one or more operations as described herein.

Computing device 110 may be configured to utilize one or more different communication protocols for receiving and sending the data packets, including Wi-Fi (e.g., the Institute of Electrical and Electronics Engineers (IEEE) 802.11 standard), the Bluetooth™ protocol, a radio frequency communication, USB, the Ethernet industrial protocol, radio waves/frequencies, the Internet protocol suite, Java remote method invocation, dynamic data exchange, or any other communication protocol.

Computing device 110 may include port 112. Port 112 may serve as an interface between computing device 110 and other computers or peripheral devices. In some examples, port 112 may refer to a physical connection, and in other examples, port 112 may refer to logical or wireless connections. Electronically, when port 112 refers to a physical connection, several conductors where port 112 and a physical cable contacts connects may provide a medium to transfer signals between devices. In some examples, port 112 may refer to a portion of computing device 110 configured to wirelessly connect with other computing devices in order to exchange information and data packets/streams.

Computing device 110 may further include one or more processors 114. One or more processors 114, in one example, may be configured to implement functionality and/or process instructions for execution within computing device 110. For example, processors 114 may be capable of processing instructions stored in a storage device of computing device 110. Examples of processors 114 may include, any one or more of a microprocessor, a controller, a digital signal processor (DSP), an application specific integrated circuit (ASIC), a field-programmable gate array (FPGA), or equivalent discrete or integrated logic circuitry.

Storage device 130 of computing device 110 may include software programs 118A and 118B, software excision module 132, and execution log 134. Storage device 130 may be configured to store information within computing device 110 during operation. Storage device 130, in some examples, is described as a computer-readable storage medium. In some examples, storage device 130 is a temporary memory, meaning that a primary purpose of storage device 130 is not long-term storage. Storage device 130, in some examples, may be described as volatile memories, meaning that storage device 130 may not maintain stored contents when the computing device is turned off. Examples of volatile memories include random access memories (RAM), dynamic random-access memories (DRAM), static random-access memories (SRAM), and other forms of volatile memories known in the art. In some examples, storage device 130 is used to store program instructions for execution by processors 114.

Communication channels 140A, 140B, 140C, and 140D may interconnect each of one or more ports 112, one or more processors 114, communication unit 116, and storage devices 103, input device 120, and output device 122 for inter-component communications (physically, communicatively, and/or operatively). In some examples, communication channels 140A, 140B, 140C, and 140D may include a system bus, a network connection, an inter-process communication data structure, or any other method for communicating data.

Communication unit 116 of computing device 110 may communicate with external devices, such as a server device, a host device, and/or client devices, via one or more wired and/or wireless networks by transmitting and/or receiving network signals on the one or more networks. Communication unit 116 may include a network interface card, such as an Ethernet card, an optical transceiver, a radio frequency transceiver, or any other type of device that can send and receive information. Examples of such network interfaces may include, but are not limited to, Bluetooth™, infrared signaling, 3G, 4G, 5G, LTE, and Wi-Fi radios as well as Universal Serial Bus (USB) and Ethernet. In some examples, computing device 110 may utilize communication unit 116 to wirelessly communicate with another computing device that is operably coupled to computing device 110.

Input device 120 may be configured to receive a user interaction. For example, input device 120 may include a touch sensitive display, pressure sensitive display, mouse, keyboard, microphone, or other sensor to generate sensor data. Using the sensor data, one or more processors 114 may determine a user interaction. For example, in response to input device 120 generating sensor data indicating that a user has touched on or near a graphical element indicating a specific feature of software program 118A to be removed, one or more processors 114 may determine that a user interaction specifies the that the specific feature is an undesired feature.

Output device 122 may be configured to output to a user. For example, output device 122 may include a display, speaker, or other output device to output to a user. Examples of a display may include, but are not limited to, liquid crystal displays (LCD), dot matrix displays, light emitting diode (LED) displays, organic light-emitting diode (OLED) displays, e-ink, similar monochrome or color displays capable of outputting visible information, or other displays.

Computing device 110 may include software programs 118A and 118B (collectively, software programs 118), software excision module 132, and execution log 134. Although the example of FIG. 1 illustrates computing device 110 as including two software programs, fewer (e.g., one software program) or additional (e.g., more than 2 software programs) may be used with computing device 110. Software programs 118 may include a collection of instructions that performs a task when executed by one or more processors 114. In some examples, software programs 118 may be an application for execution at a mobile device. Software programs 118 may be written in any suitable programming language. As shown, software program 118A may include desired features 127A, undesired features 128A, and a software binary 126A. Similarly, software program 118B may include desired features 127B, undesired features 128B, and software binary 126B. In some examples, software programs 118 may include source code. In some examples, software programs 118 may include debugging information.

Software binary 126A may be an executable form of software program 118A. For example, software binary 126A may compiled code. Compiled code may conform to, for example, but not limited to, an application binary interface (ABI), an application programming interface (API), or another interface. Software binary 126A may, in some examples, conform to Linux C/C++ binaries, where existing, feature-rich, and readily-modifiable dynamic software analysis tools (e.g., including American fuzzy lop (hereinafter, "afl")) target this class of binaries. Software binary 126A may, in some examples, conform to Windows C/C++ binaries, such as, but not limited to, winafl, Dynamorio, and PIN. Similarly, software binary 126B may be an executable form of software program 118B.

As shown, software program 118A may include desired features 127A and undesired features 128A. Similarly, software program 118B may include desired features 127B and undesired features 128B. As used herein, features may refer to a function of software programs 118 available to a user. Examples of features may include, but are not limited to, a phone home feature, audio recording feature, image capture feature, or other features. Two exemplary choices for feature class definitions may include (a) command-line options and (b) support for file formats (e.g., JPEG) or features (e.g., compression). These are convenient classes of features because they may align well with afl's model for fuzzing inputs. As used herein, "Fuzzing" may refer to "fuzz testing", as described below. In some examples, the classes of features may be expanded, and appropriate support for fuzzing input models.

As used herein, fuzz testing may refer to a model for testing that examines software that uses a simple Unix-like input-output model. For example, computing device 110 may read input from a file, operate autonomously, and write output to a file. Fuzz testing may apply to an array of types of software or software components, but terminology may be based on this model. Generally, fuzz testing may look for particular behavior in a software program. In some examples, fuzz testing may look for a crash or other detectable failure using automated manipulation of the inputs. In some examples, fuzz testing may use automated manipulation that is random or semi-random. An exemplary fuzzer may generate random sequences of bytes, direct a JPEG image reader to try to interpret the sequence of bytes, and note whether the reader crashes.

"Smarter fuzzers" may use knowledge of what an input file should look like (and then make small deviations from a grammatically-correct file) and/or instrumentation of the software under test to guide the fuzzing so that the fuzzing is less random and more efficient.

Software excision module 132 may be used to identify instructions of software binary 126A and/or software binary 126B to generate undesired feature information and/or desired feature information in execution log 134. Undesired feature information may refer to portions of software binary 126A that correspond to one or more undesired features 128A and/or to portions of software binary 126B that correspond to one or more undesired features 128B. Similarly, desired feature information may refer to portions of software binary 126A that correspond to one or more desired features 127A and/or to portions of software binary 126B that correspond to one or more desired features 127B.

Software excision module 132 may be designed for use by the end user (or a representative of the end user). Software excision module 132 may operate on software binaries 126 as delivered to the end user, without source code, debugging symbols, or other information from the software developer. Software excision module 132 may work with the end user to semi-automatically identify an undesired feature 128, determine the parts of software binaries 126 that enable and support that feature, and then excise (e.g., remove) those parts of the software. The result is a software binary that has the feature removed without introducing new undesired or undefined behaviors. While software excision module 132 is discussed as operating on software binaries 126 without source code, in some examples, software excision module 132 may use source code. Similarly, while software excision module 132 is discussed as operating on software binaries 126 without debugging symbols or debugging information, in some examples, software excision module 132 may use debugging symbols or debugging information.

Software excision module 132 may have a modular architecture, with high-level modules corresponding to the different tasks in performing late-stage software customization. Such a modular architecture may enable software excision module 132 to support a wide variety of operating systems, hardware architectures, types of binaries (i.e., different source languages and runtimes), approaches to identifying unwanted behavior, and mechanisms for excising code.

Modern software is typically "built big", supporting a vast collection of features, even though many of these features go unused by most users. Part of the reason is the practical challenge of releasing and distributing software. Testing, releasing, and distributing customized software versions is complicated and logistically expensive, but shipping unused features is cheap. Often, a particular user group requests some niche feature, which for reasons of practicality gets rolled into the overall software build. Similarly, archaic features are rarely removed, because users push back against removing features and breaking compatibility. The typical solution to this is using a plug-in architecture, but because this takes additional software development effort, it is only used in certain circumstances.

These unused features, however, have a cost to the user. One of the most significant concerns is the security cost of unneeded features. Any feature, even any unneeded code in a piece of software, increases the attack surface—that is, the "material" that a potential cyber attacker has to work with. This is a greater risk with features that the end user doesn't use, since those features are going to be less familiar yet can still be silently exploited by an attacker; due to their lack of familiarity, the end user may not recognize the risk or signs of attack. Worse, some features may make security-functionality tradeoffs that the user does not agree with. Instances of this are legion. Many common software programs have a host of features that the user does not care for yet are the source of endless security crises.

Unwanted software features have non-security costs as well. They may cause compatibility problems, reduced performance, privacy concerns, or user frustration. A "phone-home feature," is often incompatible with corporate firewall settings and often sends more private data to the manufacturer than the user wants. As used herein, a phone home feature may refer to instances when software autonomously communicates over a network with a server operated by the software manufacturer (or operated on their behalf). Usually this is done for "gathering usage statistics" or as an anti-piracy measure. However, some organizations or users may have a problem with the existence of such a feature and the information that a phone-home feature may leak. Further, poorly-implemented (or thoughtlessly-implemented) phone-home features can hurt performance (cause delays or render the software inoperable) if it is unable to contact the server. This can be a problem if: (a) the software is on a computing device not connected to a network; (b) the security policy on the network prevents communication with that server; or (c) the server is no longer in operation (e.g., the software manufacturer is now out of business).

Disabling the phone-home feature at the network level is risky, because the software often breaks or misbehaves intentionally or unintentionally when the phone-home feature fails. Other features might use the computer's microphone, built-in camera, or other privacy-sensitive resources. Another common software mal-feature is displaying advertisements. Less intentional but still-frustrating mal-features may also be included in a software program. For example, a software program might perform a check every few minutes that never succeeds (e.g., perhaps the network resource it's attempting to contact went offline long ago), but displays a dialog each time, which may interrupt the user's workflow.

Provided with a set of user constraints it should be possible to modify a software binary so that it no longer includes feature Y but still has feature X. This new binary is customized to the user, but objectively better—in addition to having a smaller attack surface, it may have improved performance, be easier to user, et cetera.

One problem in solving this problem is identifying what parts of a software binary are both critical to and yet only used by a particular feature. This is a difficult problem that it is rarely done in source code. Developers usually cannot discern, even though they wrote the code, what code paths can be deleted in order to remove a feature without harming the overall operation of the software. Doing this with a software binary is even more challenging, because there is no access to the source code, to design documentation, or to the analytical capabilities of the compiler. Inconveniently, performing this operation manually is time-consuming and requires an extremely specialized skillset.

To solve one or more of the foregoing problems, software excision module 132 may be configured for safely removing undesired software features, resulting in better software that is customized to the end user's needs. For example, one or more techniques described herein for determining and removing portions of a software binary for undesired features may safely remove parts of the software binary, giving users the power to customize software to their own needs and removing unneeded mal-features. This would result in improved cyber security and a better overall user experience.

In some examples, software excision module 132 may use a binary analysis and/or smart fuzzing to determine, with input from the user, what execution paths in a binary are only used by an unwanted feature and then rewrites the binary to excise code along those paths. For example, if a user knows that they never want to use a particular feature, which may be known to be a key component in serious exploits, that user can apply use software excision module 132 to create their own customized version of software program 118A that has the particular feature safely removed.

In accordance with the techniques of this disclosure input device 120 may receive a user interaction for identifying one or more undesired features 128A of software program 118A to be removed, software program 118A being provisioned on computing device 110 as software binary 126A. Processors 114 of computing device 110 may identify one or more execution paths of software binary 126A that implement the one or more undesired features. In this example, identifying the one or more execution paths includes outputting an indication directing the user to interact with the one or more undesired features, generating undesired feature information of execution log 134 for software binary 126A in response to the user interacting with the one or more undesired features and determining the one or more execution paths using execution log 134. One or more processors 114 remove the one or more execution paths from software binary 126A to generate a modified software binary for software program 118A.

Software excision module 132 may include a software tool for end users to perform semi-automated late-stage software customization by removing unwanted features. One benefit of software excision module 132 is that software excision module 132 may enable end users to customize their own software applications to remove features that are not desired by the user. This may reduce or eliminate the costs of those features existing in the software, including the real and very significant additional cyber-attack surface caused by software bloat. Software excision module 132 may give users capabilities that previously were only accessible to people with advanced binary-analysis skillsets and results in software that works better and is more secure.

Figure 2:
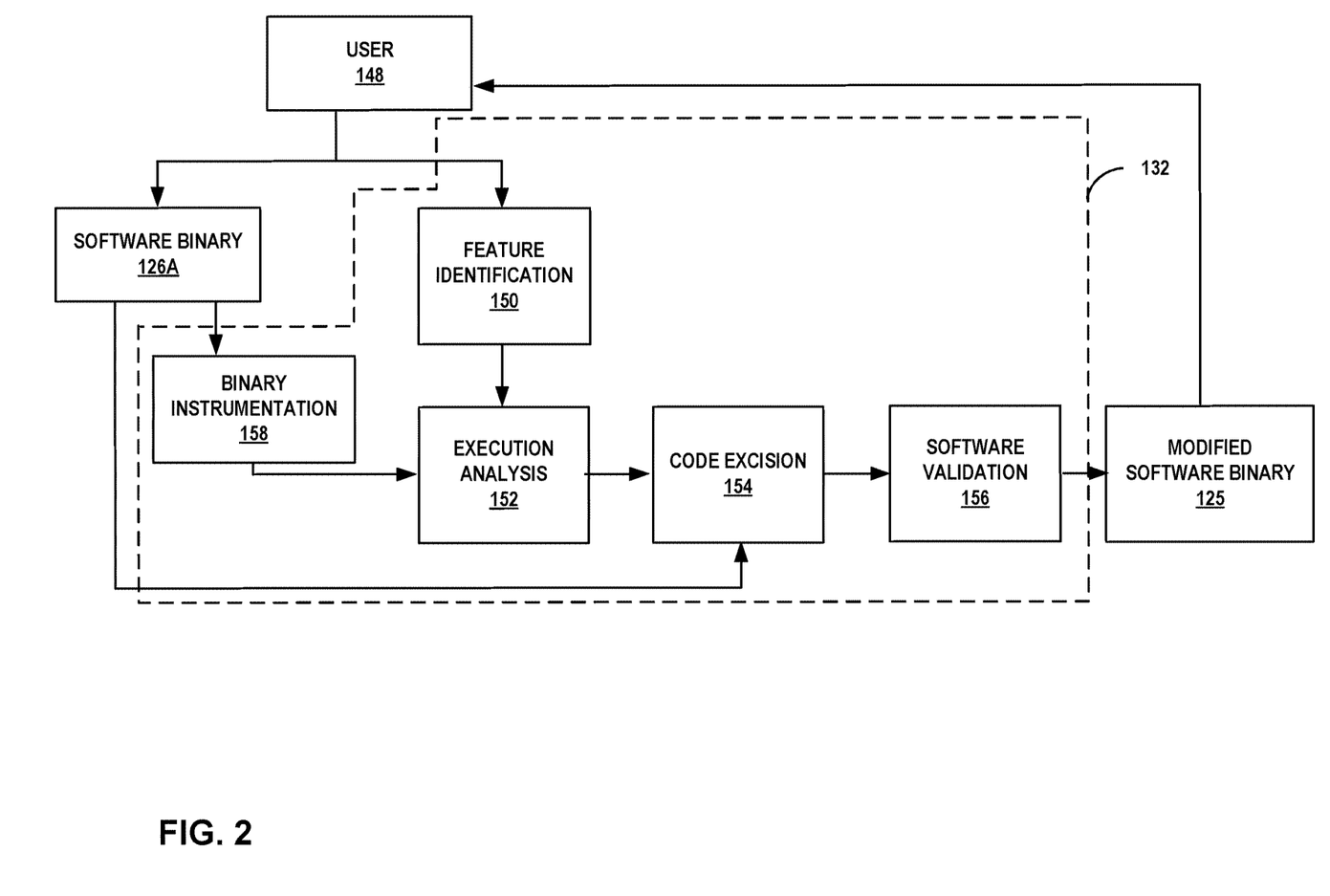
FIG. 2 is a block diagram illustrating an example process for semi-automated late-stage software customization.

FIG. 2 is a block diagram illustrating an example process for semi-automated late-stage software customization. FIG. 2 is discussed with reference to FIG. 1 for exemplary purposes only. FIG. 2 illustrates an exemplary overall workflow for software excision module 132. The various modules illustrated in FIG. 2 may be, in some examples, included in software excision module 132 of FIG. 1. However, in some examples, some of the modules illustrated in FIG. 2 may be distributed differently. As shown, software excision module 132 may include feature identification module 150, execution analysis module 152, code excision module 154, software validation module 156, and binary instrumentation 158.

Feature identification module 150 may present an interface suitable for end users to customize software binary 126A to their particular feature requirements without requiring specialization binary-analysis skills. For example, feature identification module 150 may present an accessible, semi-automated tool that guides the end user through the software customization process without requiring expertise in binary analysis. That is, for example, feature identification module 150 may include code that implements a user-driven action, such as clicking on a button or selecting a menu item. In some examples, feature identification module 150 may include code that implements a user interface element, such as displaying an advertisement within a user interface (UI) frame.

User 148 interacts with software program 118A, to which software excision module 132 has applied instrumentation. In this example, user 148 interacts with feature identification module 150 through a user interface of software excision module 132. Said differently, input device 120 receives a user interaction for identifying one or more undesired features 128A of software program 118A to be removed, software program 118A being provisioned on computing device 110 as software binary 126A. Examples of a user interaction for identifying one or more undesired features 128A of software program 118A to be removed may include, but are not limited to, user 148 selecting a selectable graphical element corresponding to undesired features 128A, user 148 entering an indication of undesired features 128A in a text box, user 148 selecting a radio button corresponding to undesired features 128A, receiving an utterance from user 148 in response to an audible prompt corresponding to undesired features 128A, receiving an utterance from user 148 indicating undesired features 128A, or another user interaction for identifying one or more undesired features 128A of software program 118A to be removed. In some examples, feature identification module 150 may suggest features to be removed. For example, in response to determining that a specific feature is associated with a security issue and that user 148 has not used the specific feature, feature identification module 150 may prompt user 148 for a user interaction for identifying to remove the specific feature.

Feature identification module 150 may receive a set of user constraints that specify one or more desired features 127A of software program 118A and one or more undesired features 128A of software program 118A. For example, user 148 may interact with feature identification module 150 through a user interface of software excision module 132 to answer a series of questions to identify one or more desired features 127A and one or more undesired features 128A. In some examples, feature identification module 150 may cause an output, at output device 122, of one or more proposed desired features and one or more proposed undesired features identified using the answers to the series of questions, and in response to receiving a user indication indicating a confirmation, feature identification module 150 may select the one or more proposed desired features as one or more desired features 127A and the one or more proposed undesired features as one or more undesired features 128A.

In any case, feature identification module 150 may cause computing device 110 to output an indication directing user 148 to interact with one or more undesired features 128A. For example, feature identification module 150 may cause output device 122 to display "Access the call home feature now," output an utterance of "Access the call home feature now," or output another indication directing user 148 to interact with one or more undesired features 128A.

The software excision module 132 end user (e.g., user 148) may interact with feature identification module 150 to "describe", in a way that supports later analysis, what feature(s) of the software should be removed. Feature identification may vary depending on the nature of the feature. In general, software excision module 132 may run software programs 118, apply binary instrumentation 158, direct user 148 to interact with the feature to be removed, and record information about execution paths in execution log 134.

Similarly, feature identification module 150 may cause computing device 110 to output an indication directing user 148 to interact with one or more desired features 1278A. For example, feature identification module 150 may output an indication directing user 148 to interact with one or more desired features 127A of software program 118A. For instance, feature identification module 150 may cause output device 122 to display "Access the contacts feature now," output an utterance of "Access the contacts feature now," or output another indication directing user 148 to interact with one or more desired features 127A.

Binary instrumentation 158 may use feature identification data and the corresponding execution paths from the instrumentation to determine code corresponding the undesired feature. For example, feature identification module 150 may generate undesired feature information of execution log 134 for software binary 126A in response to user 148 interacting with one or more undesired features 128A.

Binary instrumentation 158 may use feature identification data and the corresponding execution paths from the instrumentation to determine code corresponding a desired feature. For example, feature identification module 150 may generate desired feature information of execution log 134 for software binary 126A in response to user 148 interacting with one or more desired features 127A.

Execution analysis module 152 may use information in execution log 134 to identify the execution paths that implement that feature. Feature identification module 150 and execution analysis module 152 may operate in a feedback loop, directing the user to exercise or not exercise the feature in different ways, until execution analysis module 152 determines that that execution analysis module 152 has accurately measured the feature's execution paths.

Execution analysis module 152 may adapt techniques used for black-box code-path analysis, including "smart fuzzing", to determine what code paths are only exercised by a particular feature. Execution analysis module 152 may work closely with the feature identification module 150. Execution analysis module 152 may use smart fuzzing. As used herein, smart fuzzing or fuzzing may refer to a computer security technique for finding inputs that exercise a failure in a piece of software. For example, one might search for an input file that causes a program to crash, since code that crashes is often code that can be exploited. In smart fuzzing, the software under test may be instrumented by the fuzzing software in order to monitor what paths through the binary are taken during execution. The "fuzzer" attempts to change the input, running the software under test repeatedly with different inputs, in order to exercise new code paths. This instrumentation approach may enable the fuzzer to actively find code paths that result in crashes much more quickly than non-smart (blind) fuzzing. The approach for the execution analysis module 152 may be viewed as the inverse, where the "input" (two collections of actions: one set that does not exercise a particular feature, and one set that does) is known, and the impact the input has on the execution path is determined.

In some examples, execution analysis module 152 may use one or more techniques of a smart fuzzing tool afl to find code paths exercised by a particular input. Execution analysis module 152 may use the smart fuzzing tool afl to find a collection of code paths exercised by a collection (corpus) of inputs. Taking two corpora of inputs, one that exercises a selected feature and one that does not, execution analysis module 152 may generate collective code path data for each corpus and compare the two to find sections of software binary 126A that are exercised only in the "feature" corpus. For this, execution analysis module 152 may use software built from source code with debugging symbols and using afl's compile-time instrumentation. In this way, execution analysis module 152 may validate the outputs of the tool. Execution analysis module 152 may use a variety of other open-source dynamic binary analysis tools available. Examples of binary analysis tools may include, but are not limited to, valgrind, dyninst, bap, or another binary analysis tool. Execution analysis module 152 may also leverage static binary analysis tools, for example, to determine the program's control flow graph to ensure that the analysis is not missing a path that could exercise shared code.

In some examples, execution analysis module 152 may operate on a binary without source-code instrumentation but with debug symbols. For example, execution analysis module 152 may use the afl-qemu dynamic binary instrumentation technique instead of the compile-time instrumentation technique. The AFL fuzzing tool uses a feature of QEMU, which is a popular Linux virtualization software, to perform dynamic binary instrumentation. As used herein, binary instrumentation may refer to instances is where a user alters the operation of a software program in order to record information about that operation (e.g., which execution paths are exercised). As used herein, dynamic binary instrumentation may refer to instances where binary instrumentation is performed at runtime without modifying the on-disk copy of the software.

Execution analysis module 152 may be configured to analyze software binaries that are typical binaries produced using normal software development methods. That is, execution analysis module 152 may be configured to operate on software binaries that are not obfuscated, encrypted, or packed, to not use anti-reverse-engineering techniques, to not use just-in-time compilation. Execution analysis module 152 may be configured to operate on a software binary that includes executable code to be contained within a TEXT section of an ELF binary (or the equivalent for different executable formats). Linux uses a software binary format called ELF. ELF files have multiple sections. Code is stored in "TEXT" type sections.

Code excision module 154 may remove undesired features to disable undesired features 128A and remove supporting code for undesired features 128A. For example, code excision module 154 may cause one or more processors 114 to remove one or more execution paths to generate modified software binary 125.

Code excision module 154 may operate on standard software binaries as delivered to the end user without additional inputs from the software developer. For example, code excision module 154 may use advanced binary instrumentation and editing techniques in order to work directly on software binaries 126 without source code, debug symbols, or other information from the software developer.

In some examples, code excision module 154 may modify software binary 126A, using the inputs from an execution analysis tool, to remove or disable sections of software that implement a selected feature. Two types of code "signatures" may include "critical paths" and "dead code."

Critical paths may refer to the branch points in software program 118A that are contingent on a particular feature or option and lead to the implementation. For example, consider a graphical user interface (GUI) application with an "Upload to Cloud" button that user 148 wants to disable. The GUI main-event loop, then, may be as follows.

```
while (program_is_running) {
   event=get_event( );
   if (event_type(event)==BUTTON_CLICKED) {
      if (button_id(event)==UPLOAD_TO_CLOUD) {
         do_upload_to_cloud( );
      }
      else if (button_id(event)== . . . ) { . . . }
      . . .
   }
   else if ( . . . ) { . . . }
   . . .
}
```

In machine code, the above GUI main-event loop may be implemented as a series of conditional branches. If the event that is being processed is "the 'Upload to Cloud' button was clicked", which is how the undesired feature is actuated, that series of branches ends in the code that implements that feature. To disable the feature, execution analysis module 152 may identify the critical path of the one or more executions paths for implementing one or more undesired features 128A. For example, execution analysis module 152 may identify the critical path using undesired feature information and/or desired feature information stored in execution log 134. Code excision module 154 may replace that critical branch point with an alternative function. For example, the alternative function may cause computing device 110 to output, at output device 122, an indication that a feature corresponding to the critical path has been disabled. For instance, code excision module 154 may remove the call to do_upload_to_cloud( ) and replace the call with something else, such as a function that warns the user that the feature has been disabled (e.g., show_semms_disabled_warning_dialog( )). While this example uses pseudocode, software excision module 132 may operate directly on software binaries 126.

Dead code may refer to sections of software binary 126A that may only be reached through the critical paths. For example, dead code may correspond to one or more sections of software binary 126A that are contingent on execution of a critical path that has been replaced by an alternative function. In the example above, once code excision module 154 excises the call to do_upload_to_cloud( ), the bulk of the code that implements the "Upload to Cloud" feature is now unreachable, because code excision module 154 has disabled the only process of reaching that code. In order to reduce the attack surface of software program 118A (e.g., to give attackers using return-oriented-programming less material to work with), code excision module 154 may remove this dead code. For example, execution analysis module 152 may identify, using the critical path, dead code for implementing one or more undesired features 128A. In this example, code Excision module 154 may replace the dead code with no-operation code.

Code Excision module 154 may modify software binaries, once the undesired code paths have been identified, to disable those code paths. Editing the binary to remove the code may include, but is not limited to, replacing code with no-operation ("no-op") code. However, replacing code may cause software program 118A to crash if the removed feature is actuated. One or more techniques described herein allow for a more elegant edit is that, for a variety of reasons, is much safer to edit the binary "in place." That is, code excision module 154 may edit software binary 126A without changing the size or location of code.

Code excision module 154 may remove identified software parts of software programs 118 without negatively impacting the behavior of the software programs 118. For example, code excision module 154 may provide one or more techniques to safely remove excise sections of software binary 126A, depending on the nature of the excision and user requirements.

In some examples, code excision module 154 may replace calls to disabled functionality with calls to a (non-fatal) warning. For example, code excision module 154 may disable branch points by editing the machine code may result in a call that causes software program 118A to abort (e.g., exit( )). Code excision module 154 may disable dead code by replacing it with no-operation code (0x90 in x86 machine code). In some examples, code excision module 154 may be configured to interdict calls to disabled functionality, without removing the code that implements that functionality, and present the user with an option to block the feature or to continue, so that features that are rarely but sometimes desired can be disabled in the common case. In some examples, code excision module 154 may be configured to block unused sections of dynamically-loaded shared libraries by using runtime function hooking to interdict attempted calls to disabled functions.

Software validation module 156 may test modified software binary 125. Such tests may involve user interaction, to verify that only one or more undesired feature 128A have been removed. Software validation module 156 may provide assurance that the functionality and stability of software program 118A have not been compromised beyond the removal of the undesired features 128A. For example, software validation module 156 may use a post-modification analysis, a corpus of test cases, and carefully-designed software excision techniques to ensure that software program 118A is not compromised by code excision module 154. In some examples, software validation module 156 may apply static binary analysis to ensure that jumps into the middle of removed code are not possible.

Software validation module 156 may use afl directly, without any knowledge of what feature was disabled. For example, if the code modification is changed so that disabled branches result in a crash (e.g., by calling a function that intentionally crashes the program), afl in its out-of-the-box smart fuzzing mode will work to construct inputs that will exercise this disabled branch. Using afl's test-case-minimization features, software validation module 156 may narrow execution paths down to exactly what input uses the disabled branch. The end result is identifying, without having given afl any a priori knowledge, exactly what feature we disabled earlier. Software validation module 156 may use binary code-coverage analysis tools to, at the same time, validate that excised dead code is never executed.

Software validation module 156 may reconstruct modified software binary 125. For example, to reconstruct modified software binary 125, software validation module 156 may perform code signing. As used herein, code signing may refer to one or more techniques using a certificate-based digital signature to sign modified software binary 125. Said differently, software validation module 156 validates modified software binary 125 and modified software binary 125 is delivered to user 148. For example, software validation module 156 validates modified software binary 125 in response to determining that modified software binary 125 executes one or more desired features 127A of software program 118A. In some examples, software validation module 156 may code sign modified software binary 125 in response to determining that modified software binary 125 executes one or more desired features 127A.

Software excision module 132 may use advanced binary analysis tools to create an automated, user-friendly software tool that enables the end user to customize binary software to remove unnecessary, unwanted, and undesirable features. This may reduce or eliminate the ever-increasing software bloat that is detrimental to user 148 and harmful to system security. The result may be software programs 118 that meet an individual user's needs but are faster, more user-friendly, and more secure.

Figure 3:
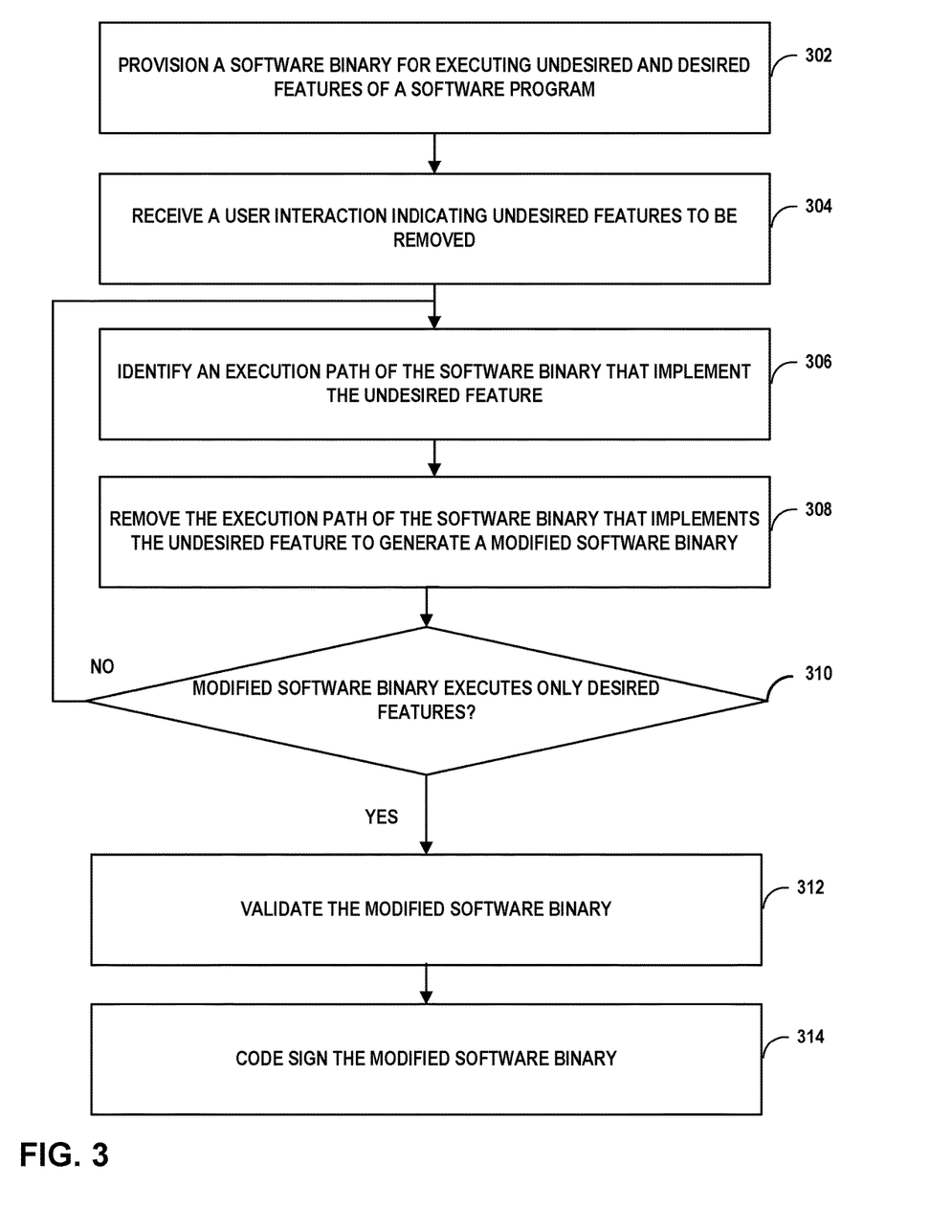
FIG. 3 is a flow diagram illustrating example operations of a computing device that implements semi-automated late-stage software customization, in accordance with one or more aspects of this disclosure.

FIG. 3 is a flow diagram illustrating example operations of a computing device that implements semi-automated late-stage software customization, in accordance with one or more aspects of this disclosure. The techniques of FIG. 3 may be performed by one or more processors of a computing device, such as computing device 110 illustrated in FIG. 1. For purposes of illustration only, the techniques of FIG. 3 are described within the context of computing device 110 of FIG. 1 and the example process for semi-automated late-stage software customization of FIG. 2, although computing devices having configurations different than that of computing device 110 may perform the techniques of FIG. 3. Although FIG. 3 is discussed with reference to software program 118A, in some examples, similar operations may be performed on software program 118B.

In accordance with the techniques of this disclosure, one or more processors 114 of computing device 110 may provision software binary 126A for executing undesired and desired features of a software program (302). Input device 120 receives a user interaction indicating undesired features 128A to be removed (304). Execution analysis module 152 identifies an execution path of software binary 126A that implement undesired feature 128A (306). Code excision module 154 removes the execution path of software binary 126A that implements undesired feature 128A to generate modified software binary 125 (308). Software validation module 156 demines whether modified software binary 125 executes only desired features 127A (310). In response to determining that modified software binary 125 does not execute desired features 127A ("NO" of 310), 306 repeats. In response, however, to determining that modified software binary 125 executes desired features 127A ("YES" of 310), software validation module 156 validates modified software binary 126 (312) and code signs modified software binary 126 (314).

Figure 4:
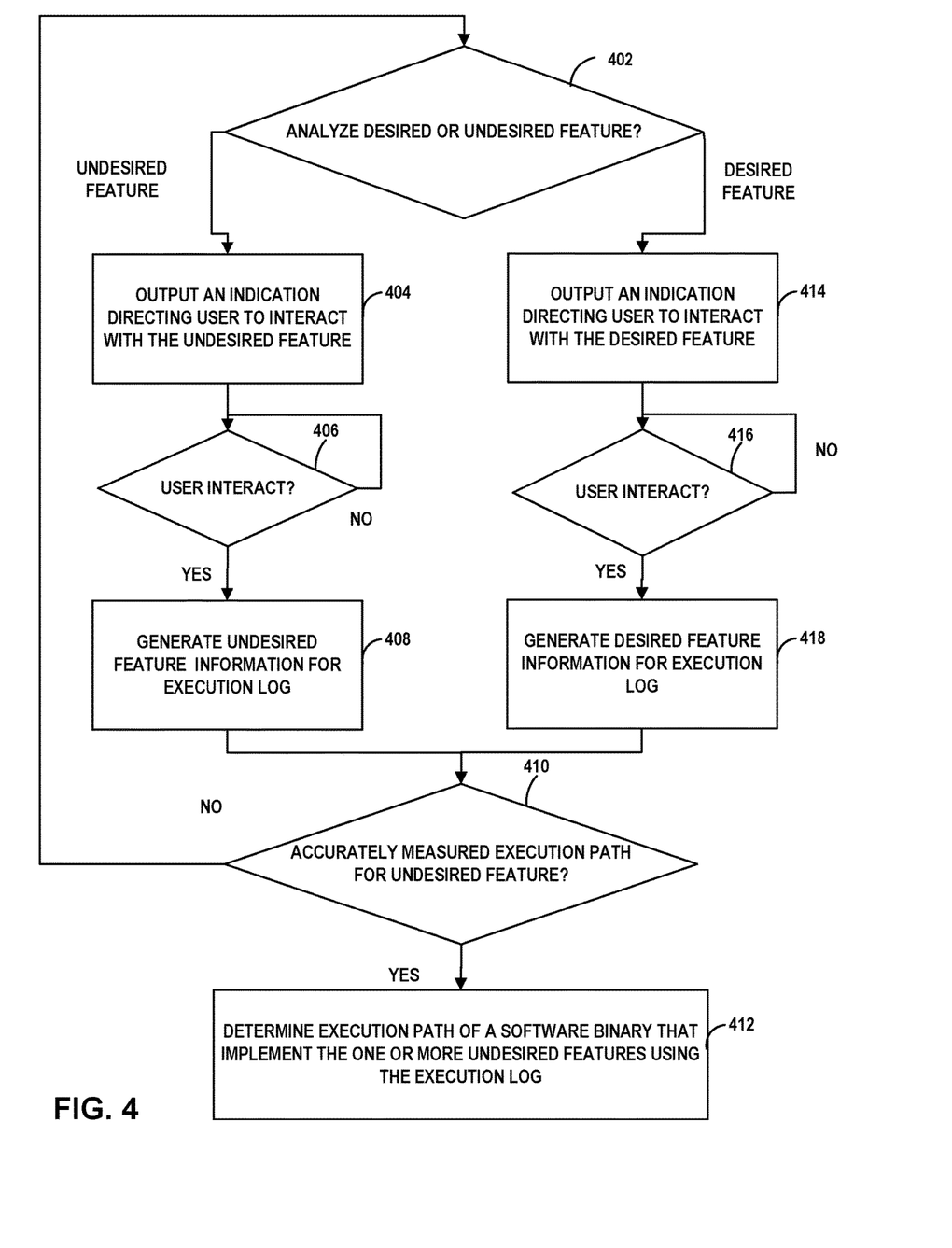
FIG. 4 is a flow diagram illustrating example operations of a computing device that identifies an execution path of a software binary that implements an undesired feature, in accordance with one or more aspects of this disclosure.

FIG. 4 is a flow diagram illustrating example operations of a computing device that identifies an execution path of a software binary that implements an undesired feature, in accordance with one or more aspects of this disclosure. The techniques of FIG. 4 may be performed by one or more processors of a computing device, such as computing device 110 illustrated in FIG. 1. For purposes of illustration only, the techniques of FIG. 4 are described within the context of computing device 110 of FIG. 1 and the example process for semi-automated late-stage software customization of FIG. 2, although computing devices having configurations different than that of computing device 110 may perform the techniques of FIG. 4. Although FIG. 4 is discussed with reference to software program 118A, in some examples, similar operations may be performed on software program 118B.

In accordance with the techniques of this disclosure, feature identification module 150 may determine whether to analyze desired feature 127A or undesired feature 128A (402). In response to determining to analyze undesired feature 128A ("UNDESIRED FEATURE" of 402), feature identification module 150 outputs an indication directing user to interact with undesired feature 128A (404). Input device 120 determines whether user 148 has interacted with undesired feature 128A (406). In response to determining that user 148 has not interacted with undesired feature 128A ("NO" of 406), input device 120 continues to determine whether user 148 has interacted with undesired feature 128A. In response, however, to determining that user 148 has interacted with undesired feature 128A ("YES" of 406), binary instrumentation 158 generates undesired feature information for execution log 134 (408).

In response, however, to determining to analyze desired feature 127A ("DESIRED FEATURE" of 402), feature identification module 150 outputs an indication directing user to interact with desired feature 127A (414). Input device 120 determines whether user 148 has interacted with desired feature 127A (416). In response to determining that user 148 has not interacted with desired feature 127A ("NO" of 416), input device 120 continues to determine whether user 148 has interacted with desired feature 127A. In response, however, to determining that user 148 has interacted with desired feature 127A ("YES" of 416), binary instrumentation 158 generates desired feature information for execution log 134 (418).

In any case, execution analysis module 152 determines whether execution analysis module 152 has accurately measured an execution path for undesired feature 128A (410). In response to determining that execution analysis module 152 has accurately measured the execution path for undesired feature 128A ("YES" of 410), execution analysis module 152 determines the execution path of software binary 126A that implement the one or more undesired features 128A using execution log 134 (412). In response, however, to determining that execution analysis module 152 has not accurately measured the execution path for undesired feature 128A ("NO" of 410), 402 repeats.

Figure 5:
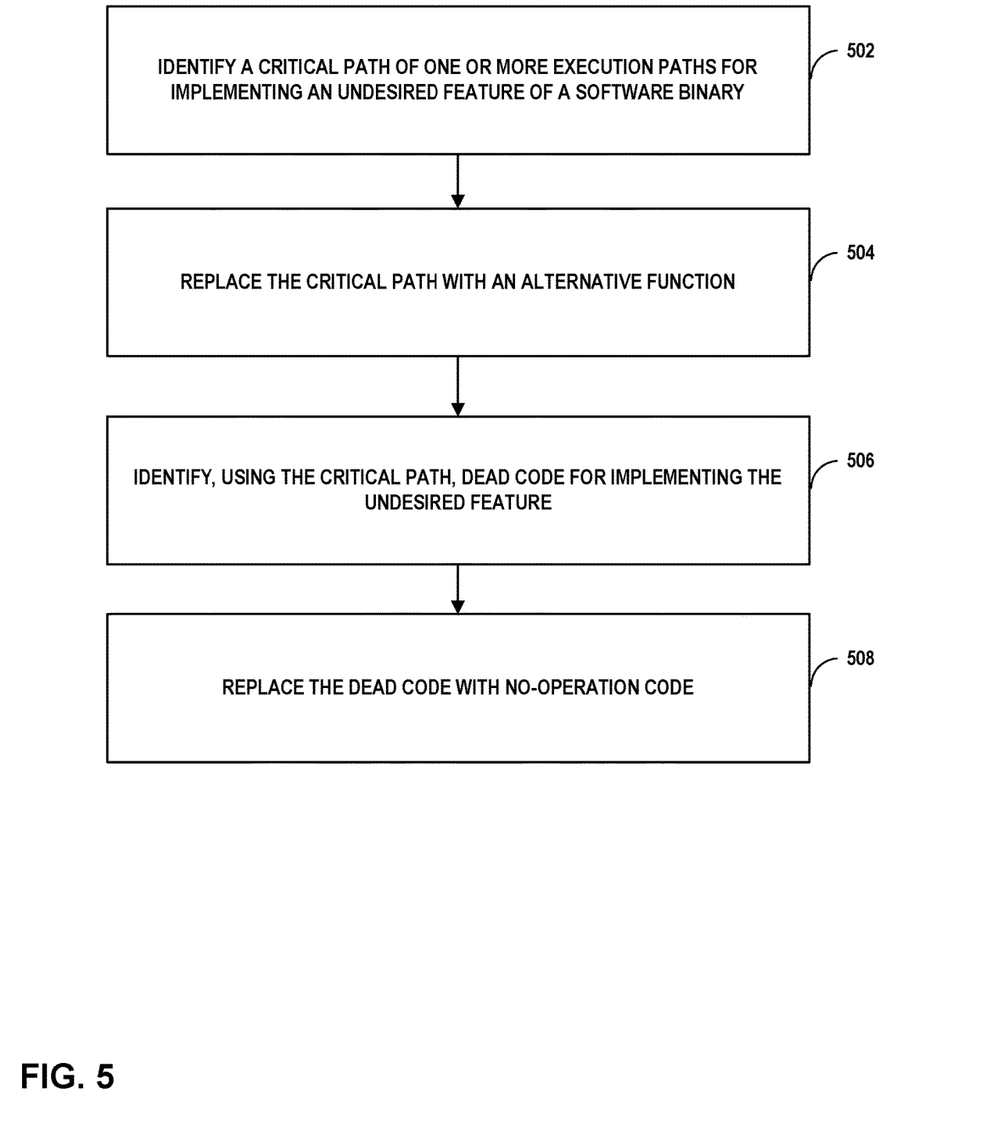
FIG. 5 is a flow diagram illustrating example operations of a computing device that removes an execution path of a software binary that implements an undesired feature, in accordance with one or more aspects of this disclosure.

FIG. 5 is a flow diagram illustrating example operations of a computing device that removes an execution path of a software binary that implements an undesired feature, in accordance with one or more aspects of this disclosure. The techniques of FIG. 5 may be performed by one or more processors of a computing device, such as computing device 110 illustrated in FIG. 1. For purposes of illustration only, the techniques of FIG. 5 are described within the context of computing device 110 of FIG. 1 and the example process for semi-automated late-stage software customization of FIG. 2, although computing devices having configurations different than that of computing device 110 may perform the techniques of FIG. 5. Although FIG. 5 is discussed with reference to software program 118A, in some examples, similar operations may be performed on software program 118B.

In accordance with the techniques of this disclosure, code excision module 154 identifies a critical path of one or more execution paths for implementing undesired feature 128A of software binary 126A (502). Code excision module 154 may replace the critical path with an alternative function (504). Code excision module 154 identifies, using the critical path, dead code for implementing undesired feature 128A (506). Code excision module 154 replace the dead code with no-operation code (508).

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
   receiving, by a computing device, a user interaction for identifying one or more undesired features of a software program to be removed, the software program being provisioned on the computing device as a software binary;
   identifying, by the computing device, one or more execution paths of the software binary that implement the one or more undesired features, wherein identifying the one or more execution paths comprises:
      outputting an indication directing a user to interact with one or more elements of a user interface of the software program that are associated with the one or more undesired features;
      generating undesired feature information of an execution log for the software binary in response to the user interacting with the one or more elements of the user interface of the software program that are associated with the one or more undesired features; and
      determining the one or more execution paths using the execution log; and
   removing, by the computing device, the one or more execution paths to generate a modified software binary, wherein removing the one or more execution paths comprises:
      identifying a critical path of the one or more execution paths for implementing the one or more undesired features; and
      replacing the critical path with an alternative function.

2. The method of claim 1, further comprising:
   validating, by the computing device, the modified software binary in response to determining that the modified software binary executes one or more desired features of the software program.

3. The method of claim 2, further comprising:
   reconstructing, by the computing device, the modified software binary in response to determining that the modified software binary executes the one or more desired features.

4. The method of claim 1, wherein identifying the one or more execution paths further comprises:
   outputting an indication directing the user to interact with one or more elements of the user interface of the software program that are associated with one or more desired features of the software program; and
   generating desired feature information of the execution log for the software binary in response to the user interacting with the one or more elements of the user interface of the software program that are associated with the one or more desired features.

5. The method of claim 1, wherein the alternative function causes the computing device to output an indication that a feature corresponding to the critical path has been disabled.

6. The method of claim 1, wherein removing the one or more execution paths comprises:
   identifying, using the critical path, dead code for implementing the one or more undesired features, wherein dead code corresponds to one or more sections of the software binary that are contingent on execution of the critical path; and
   replacing the dead code with no-operation code.

7. The method of claim 1, wherein receiving the user interaction for identifying the one or more undesired features to be removed comprises receiving a set of user constraints that specify one or more desired features of the software program and the one or more undesired features of the software program.

8. The method of claim 1, wherein the computing device is a mobile computing device and wherein the software program is a software application executing at the mobile computing device.

9. A device comprising:
   a memory for storing a software program; and
   one or more processors configured to:
      receive a user interaction for identifying one or more undesired features of the software program to be removed, the software program being provisioned on the computing device as a software binary;
      identify one or more execution paths of the software binary that implement the one or more undesired features, wherein, to identify the one or more execution paths, the one or more processors are configured to:
         output an indication directing a user to interact with one or more elements of a user interface of the software program that are associated with the one or more undesired features;
         generate undesired feature information of an execution log for the software binary in response to the user interacting with the one or more elements of the user interface of the software program that are associated with the one or more undesired features; and
         determine the one or more execution paths using the execution log; and remove the one or more execution paths to generate a modified software binary, wherein, to remove the one or more execution paths, the one or more processors are configured to:
  identify a critical path of the one or more execution paths for implementing the one or more undesired features; and
  replace the critical path with an alternative function.

10. The device of claim 9, wherein the one or more processors are further configured to:
  validate the modified software binary in response to determining that the modified software binary executes one or more desired features of the software program.

11. The device of claim 10, wherein the one or more processors are further configured to:
  reconstruct the modified software binary in response to determining that the modified software binary executes the one or more desired features.

12. The device of claim 9, wherein, to identify the one or more execution paths further, the one or more processors are configured to:
  output an indication directing the user to interact with one or more elements of the user interface of the software program that are associated with one or more desired features of the software program; and
  generate desired feature information of the execution log for the software binary in response to the user interacting with the one or more elements of the user interface of the software program that are associated with the one or more desired features.

13. The device of claim 9, wherein the alternative function causes the one or more processors to output an indication that a feature corresponding to the critical path has been disabled.

14. The device of claim 9, wherein, to remove the one or more execution paths, the one or more processors are configured to:
  identify, using the critical path, dead code for implementing the one or more undesired features, wherein dead code corresponds to one or more sections of the software binary that are contingent on execution of the critical path; and
  replace the dead code with no-operation code.

15. The device of claim 9, wherein, to receive the user interaction for identifying the one or more undesired features to be removed, the one or more processors are configured to receive a set of user constraints that specify one or more desired features of the software program and the one or more undesired features of the software program.

16. The device of claim 9, wherein the device is a mobile computing device and wherein the software program is a software application executing at the mobile computing device.

17. A non-transitory computer-readable storage medium storing instructions that when executed by one or more processors cause the one or more processors to:
  receive a user interaction for identifying one or more undesired features of a software program to be removed, the software program being provisioned on the computing device as a software binary;
  identify one or more execution paths of the software binary that implement the one or more undesired features, wherein the instructions that cause the one or more processors to identify the one or more execution paths comprise instructions that cause the one or more processors to:
    output an indication directing a user to interact with one or more elements of a user interface of the software program that are associated with the one or more undesired features;
    generate undesired feature information of an execution log for the software binary in response to the user interacting with the one or more elements of the user interface of the software program that are associated with the one or more undesired features; and
    determine the one or more execution paths using the execution log; and
  remove the one or more execution paths to generate a modified software binary, wherein the instructions that cause the one or more processors to remove the one or more execution paths comprise instructions that cause the one or more processors to:
    identify a critical path of the one or more execution paths for implementing the one or more undesired features; and
    replace the critical path with an alternative function.

18. The non-transitory computer readable storage medium of claim 17, wherein the instructions further cause the one or more processors to:
  validate the modified software binary in response to determining that the modified software binary executes one or more desired features of the software program.

* * * * *